(12) United States Patent
Sugita et al.

(10) Patent No.: US 10,451,522 B2
(45) Date of Patent: Oct. 22, 2019

(54) ENGINE TEST APPARATUS

(71) Applicant: A&D Company, Limited, Tokyo (JP)

(72) Inventors: Mitsuharu Sugita, Tokyo (JP); Yuta Egashira, Tokyo (JP); Keisuke Yasuno, Tokyo (JP)

(73) Assignee: A & D Company, Limited, Tokyo (JP)

( * ) Notice: Subject to any disclaimer, the term of this patent is extended or adjusted under 35 U.S.C. 154(b) by 0 days.

(21) Appl. No.: 15/658,491

(22) Filed: Jul. 25, 2017

(65) Prior Publication Data
US 2018/0031447 A1 Feb. 1, 2018

(30) Foreign Application Priority Data

Jul. 27, 2016 (JP) .................. 2016-147534

(51) Int. Cl.
| | |
|---|---|
| *G01S 7/48* | (2006.01) |
| *G01S 17/87* | (2006.01) |
| *G01M 15/02* | (2006.01) |
| *G01M 15/04* | (2006.01) |
| *G01P 3/36* | (2006.01) |
| *G01S 17/58* | (2006.01) |
| *G01S 17/88* | (2006.01) |
| *G01L 1/25* | (2006.01) |

(52) U.S. Cl.
CPC .......... *G01M 15/042* (2013.01); *G01M 15/02* (2013.01); *G01P 3/36* (2013.01); *G01S 7/4808* (2013.01); *G01S 17/58* (2013.01); *G01S 17/87* (2013.01); *G01S 17/88* (2013.01); *G01L 1/25* (2013.01)

(58) Field of Classification Search
CPC .... G01M 15/042; G01M 15/02; G01M 15/04;
G01M 15/044; G01M 1/10; G01S 17/58;
G01S 17/88; G01L 1/25; G01L 25/006;
G01L 3/242; G01L 3/04; G01P 3/36
See application file for complete search history.

(56) References Cited

U.S. PATENT DOCUMENTS

| | | | | |
|---|---|---|---|---|
| 4,680,959 A | * | 7/1987 | Henry ................. | G01M 15/044 703/8 |
| 5,078,008 A | * | 1/1992 | Yagi .................... | G01M 15/044 73/116.05 |
| 5,144,840 A | * | 9/1992 | Whipple, III .......... | G01H 1/003 73/660 |

(Continued)

FOREIGN PATENT DOCUMENTS

JP 5800001 B2 10/2015

*Primary Examiner* — Brandi N Hopkins
(74) *Attorney, Agent, or Firm* — Locke Lord LLP

(57) ABSTRACT

An engine test apparatus includes a dynamometer connected to an engine through a shaft, and a control calculation device configured to control operations of the engine and the dynamometer. The shaft has one end connected to an output shaft of the engine, and the other end connected to a rotation shaft of the dynamometer, and includes a Doppler velocimeter configured to emit laser light to the one end of the shaft or the output shaft of the engine to contactlessly measure a rotation speed of the output shaft of the engine, and transmit the measured rotation speed to the control calculation device. The control calculation device uses the rotation speed transmitted from the Doppler velocimeter to control the operation of the dynamometer.

3 Claims, 9 Drawing Sheets

(56) References Cited

U.S. PATENT DOCUMENTS

| | | | | |
|---|---|---|---|---|
| 5,465,624 A * | 11/1995 | Tseytlin | ............ | G01P 3/366 |
| | | | | 73/653 |
| 2006/0106526 A1 * | 5/2006 | Sugita | ............ | G01M 15/044 |
| | | | | 701/114 |
| 2009/0100919 A1 * | 4/2009 | Sugita | ............ | F02D 41/1497 |
| | | | | 73/114.15 |
| 2013/0068002 A1 * | 3/2013 | Nagy | ............ | G01M 15/02 |
| | | | | 73/114.13 |
| 2016/0084735 A1 * | 3/2016 | Akiyama | ............ | G01M 15/04 |
| | | | | 73/116.05 |
| 2018/0003589 A1 * | 1/2018 | Akiyama | ............ | G01M 15/04 |
| 2018/0031447 A1 * | 2/2018 | Sugita | ............ | G01M 15/042 |

\* cited by examiner

ENGINE TEST APPARATUS

CROSS REFERENCE TO RELATED APPLICATIONS

This application is related to co-pending application: "ENGINE TEST APPARATUS" filed even date herewith in the names of Mitsuharu SUGITA, Yuta EGASHIRA and Keisuke YASUNO, which claims priority to Japanese Application No. 2016-147646 filed Jul. 27, 2016, and the above application is assigned to the assignee of the present application and is incorporated by reference herein.

BACKGROUND

Technical Field

The present invention relates to an engine test apparatus, for example, relates to an engine test apparatus including a dynamometer to measure various characteristics of an engine.

Related Art

Conventionally, a dynamometer system (engine test apparatus) has been used which has a dynamometer connected to a specimen including an engine to measure various characteristics of the engine by simulation. For example, a configuration of the dynamometer system is proposed in JP 5800001 B2. Here, with reference to FIG. 8, the configuration of the dynamometer system described in JP 5800001 B2 will be briefly described.

As illustrated in FIG. 8, a dynamometer system (engine test apparatus) 100 according to a related art includes a dynamometer D, a shaft (connecting shaft) S configured to connect an output shaft of an engine E and a rotation shaft of the dynamometer D, an engine control device 130 configured to control the engine E through a throttle actuator 120, an inverter 140 configured to supply electric power to the dynamometer D, a dynamometer control device 160 configured to control the dynamometer D through the inverter 140, a shaft torque sensor 150 configured to detect a torsion torque of the shaft S, and an encoder 161 configured to detect a rotation speed (rotation rate) of an output shaft of the dynamometer D.

Then, the engine control device 130 starts the engine E through the throttle actuator 120 at a predetermined time, and drives the engine E in a predetermined manner. In addition, the dynamometer control device 160 generates a torque current command corresponding to a torque value to be generated by the meter D, on the basis of a torsion torque (torsion torque at a portion closer to the dynamometer D) detected by the shaft torque sensor 150, and a rotation speed (rotation rate) of the dynamometer D detected by the encoder 161, and inputs the torque current command to the inverter 140 to control the operation of the dynamometer D.

Then, in the dynamometer system 100, the operation of the dynamometer D is controlled by a torque current command generated as described above, so that the engine E is controlled to be operated in an unloaded state as if the engine E is not connected to the shaft S and the dynamometer D, upon starting the engine E. That is, in the dynamometer system 100 described in JP 5800001 B2, "inertia compensation control" is performed in which the torsion torque of a portion of the shaft S closer to the dynamometer D, and the rotation speed (rotation rate) of the dynamometer D are used to determine a torque value to be generated by the dynamometer D, for control of an absorption torque of the dynamometer D.

CITATION LIST

Patent Literature

Patent Literature 1: JP 5800001 B2

SUMMARY

However, the inertia compensation control using the rotation speed (dynamometer rotation rate) of the dynamometer D according to the related art, has a problem that a frequency range for inertia compensation is limited. Specifically, as illustrated in FIG. 9A, when the dynamometer rotation rate is used for inertia compensation control, there is an antiresonance point in a frequency range around 100 Hz (see a portion A in FIG. 9A), so that the problem arises that the gain drops in this frequency range, and the inertia compensation performance cannot be expected over a wide area. Furthermore, as illustrated in FIG. 9B, when the dynamometer rotation rate is used, a phase advances in antiresonance (see portion B in FIG. 9B) and returns at the resonance point. Therefore, a problem also arises that when an inertia compensation closed loop is formed, resonance tends to occur at a resonance point. That is, since in the dynamometer system (engine test apparatus) 100 according to the related art, the inertia compensation control is performed using the rotation speed (dynamometer rotation rate) of the dynamometer D, so that the frequency range for inertia compensation is limited, and various characteristics of the engine may not be measured with high accuracy, upon starting the engine E or the like. Note that, in FIGS. 9A and 9B, broken lines represent dynamometer rotation rate transmission characteristics, and solid lines represent engine rotation rate transmission characteristics.

Incidentally, since there is no antiresonance point in the rotation speed (rotation rate) of the output shaft of the engine, when the rotation speed (rotation rate) of the output shaft of the engine can be used for the inertia compensation control as described above, the problems Is solved. However, in general, engine test apparatuses according to the related art are known to have a configuration in which the rotation speed (dynamometer rotation rate) of the rotation shaft of the dynamometer D is measured, and the measured dynamometer rotation rate is used to perform inertia compensation control, and no engine test apparatus is known to measure the rotation speed of the output shaft of the engine E, and use the measured rotation speed to control the dynamometer rotation. This is because influence of vibration or heat of the engine E disables accurate measurement of the rotation speed of the output shaft of the engine E.

The present invention has been made in view of the above problems, and it is an object of the present invention to provide an engine test apparatus capable of measuring various characteristics of an engine with high accuracy.

According to a first aspect of the present invention, there is provided an engine test apparatus including a dynamometer connected to an engine through a shaft, and a control device configured to control operations of the engine and the dynamometer, in which the shaft has one end connected to an output shaft of the engine, and the other end connected to a rotation shaft of the dynamometer, and includes a Doppler velocimeter configured to emit laser light to the one end of the shaft or the output shaft of the engine to contactlessly measure a rotation speed of the output shaft of the engine, and transmit the measured rotation speed to the control device, and the control device uses the rotation speed transmitted from the Doppler velocimeter to control the operation of the dynamometer.

As described above, according to the first aspect of the present invention, a Doppler velocimeter is provided to emit laser light to the one end of the shaft connected to the output shaft of the engine, or the output shaft of the engine to contactlessly measure the rotation speed (rotation rate) of the output shaft of the engine, and transmit the measured rotation speed to the control device is provided, and the measured rotation speed of the output shaft of the engine is used to control the operation of the dynamometer. That is, in the first aspect, the rotation speed of the output shaft of the engine is contactlessly measured without influence of the heat of the engine, and an accurate value can be measured in the vicinity of the engine. Furthermore, according to the configuration of the first aspect, for example, inertia compensation can be performed using the rotation speed (rotation rate) of an output shaft of an engine, obtained as described above, and the frequency range for inertia compensation is not limited as in the inertia compensation control according to a related art using the rotation speed of the dynamometer (dynamometer rotation rate). Therefore, not only the behavior of an engine at starting up, but also rotation speed variation of the engine caused by explosion variation can be reproduced. Thus, according to the first aspect, characteristics of an engine can be measured with high accuracy as compared with a related art.

According to a second aspect of the present invention, there is provided an engine test apparatus including a dynamometer connected to an engine through a shaft, and a control device configured to control operations of the engine and the dynamometer, in which the shaft has one end connected to an output shaft of the engine, and the other end connected to a rotation shaft of the dynamometer, and includes a pair of Doppler velocimeters disposed opposite to each other to face the one end of the shaft or the output shaft of the engine, the pair of Doppler velocimeters each emit laser light to the one end of the shaft or the output shaft of the engine to contactlessly measure a rotation speed of the output shaft of the engine, and transmits the measured rotation speed to the control device, and the control device calculates an average value of the rotation speed on the basis of the rotation speeds of the output shaft of the engine, transmitted from the pair of Doppler velocimeters, and uses the average value of the rotation speed to control the operation of the dynamometer.

In the second embodiment of the present invention, the above configuration is adopted for the following reason. Specifically, a rotation speed measured by a Doppler velocimeter includes rotation noise caused by vibration (hereinafter referred to as "engine body vibration") in a direction perpendicular to a laser emission direction and in a direction detected as the rotation speed, of vibrations of the engine or the shaft. Therefore, in the second aspect, the pair of Doppler velocimeters is provided to be disposed opposite to each other to face one end of the shaft (or the output shaft of the engine) to calculate an average value of the rotation speeds (rotation rates) of the output shaft of the engine, measured by the pair of Doppler velocimeters. An average value of the rotation speeds (rotation rates) measured by the pair of Doppler velocimeters is calculated in this manner, so that rotation noise caused by the influence of "engine body vibration" can be cancel, and thus, an accurate rotation speed of the engine can be obtained. According to the second aspect, since the operation of the dynamometer can be controlled using the accurate rotation speed of the engine, various characteristics of the engine can be measured with high accuracy as compared with the related art.

According to a third aspect of the present invention, there is provided an engine test apparatus including a dynamometer connected to an engine through a shaft, and a control device configured to control operations of the engine and the dynamometer, in which the shaft has one end connected to an output shaft of the engine, and the other end connected to a rotation shaft of the dynamometer, and includes a first Doppler velocimeter configured to emit laser light to the one end of the shaft or the output shaft of the engine to contactlessly measure a rotation speed of the output shaft of the engine, and transmit the measured rotation speed to the control device, and a second Doppler velocimeter configured to emit laser light to an engine body to contactlessly measure a vibration speed of the engine body in a direction perpendicular to an emission direction of the laser light and in a direction parallel to a rotation direction of the shaft, and transmit the measured vibration speed to the control device, the first and second Doppler velocimeters are disposed to emit laser light in the same direction, and the control device calculates a value obtained by subtracting the vibration speed of the engine body, transmitted from the second Doppler velocimeter, from a rotation speed of the engine transmitted from the first Doppler velocimeter, and uses the calculated value to control the operation of the dynamometer.

In the third aspect of the present invention, the above configuration is adopted for the following reason. Specifically, as described above, the rotation speed measured by the first Doppler velocimeter includes rotation noise caused by the influence of "engine body vibration". Therefore, in the third aspect, the second Doppler velocimeter is provided which emits laser light to the engine body to contactlessly measure the vibration speed of the engine body (second Doppler velocimeter emitting laser light in the same direction as that of the first Doppler velocimeter). In the third aspect, the rotation noise is canceled by subtracting the vibration speed of the engine body measured by the second Doppler velocimeter, from the rotation speed of the output shaft of the engine measured by the first Doppler velocimeter, and an accurate rotation speed (rotation rate) is obtained. In the third aspect, since the operation of the dynamometer is controlled using the accurate rotation speed of the output shaft of the engine, various characteristics of the engine can be measured with high accuracy as compared with the related art.

According to a fourth aspect of the present invention, there is provided an engine test apparatus including a dynamometer connected to an engine through a shaft, and a control device configured to control operations of the engine and the dynamometer, in which the shaft has one end connected to an output shaft of the engine, and the other end connected to a rotation shaft of the dynamometer, and includes a Doppler velocimeter configured to emit laser light to the one end of the shaft or the output shaft of the engine to contactlessly measure a rotation speed of the output shaft of the engine, and transmit the measured rotation speed to the control device, and a displacement meter configured to contactlessly measure displacement in a rotation direction of the shaft at one end of the shaft, measured by the Doppler velocimeter, and transmit the measured displacement to the control device, and the control device calculates, as rotation noise, a speed obtained by differentiating displacement in a rotation direction transmitted from the displacement meter, calculates a value obtained by subtracting the rotation noise from rotation speed of the output shaft of the engine, transmitted from the first Doppler velocimeter, and uses the calculated values to control the operation of the dynamometer.

In the fourth embodiment of the present invention, the above configuration is adopted for the following reason. Specifically, as described above, the rotation speed measured by the Doppler velocimeter includes rotation noise caused by the influence of "engine body vibration". Therefore, in the fourth mode, the displacement meter is provided which noncontactly measures displacement of the shaft in the rotation direction, in a measurement unit of the Doppler velocimeter, calculates, as the rotation noise, the speed obtained by differentiating the displacement in the rotation direction measured by the displacement meter, and subtracts the rotation noise (speed obtained by differentiating the displacement) from the rotation speed of the output shaft of the engine transmitted from the Doppler velocimeter, and thus the rotation noise can be removed to obtain an accurate rotation speed. In the fourth aspect, since the operation of the dynamometer is controlled using the accurate rotation rate of the engine, various characteristics of the engine can be measured with high accuracy as compared with the related art.

According to an aspect of the present invention, an engine test apparatus can be provided to acquire an accurate "rotation speed of the output shaft of the engine" for use to control the dynamometer, and thus, the characteristics of the engine can be measured with high accuracy as compared with the related art.

DETAILED DESCRIPTION

Figure 8:
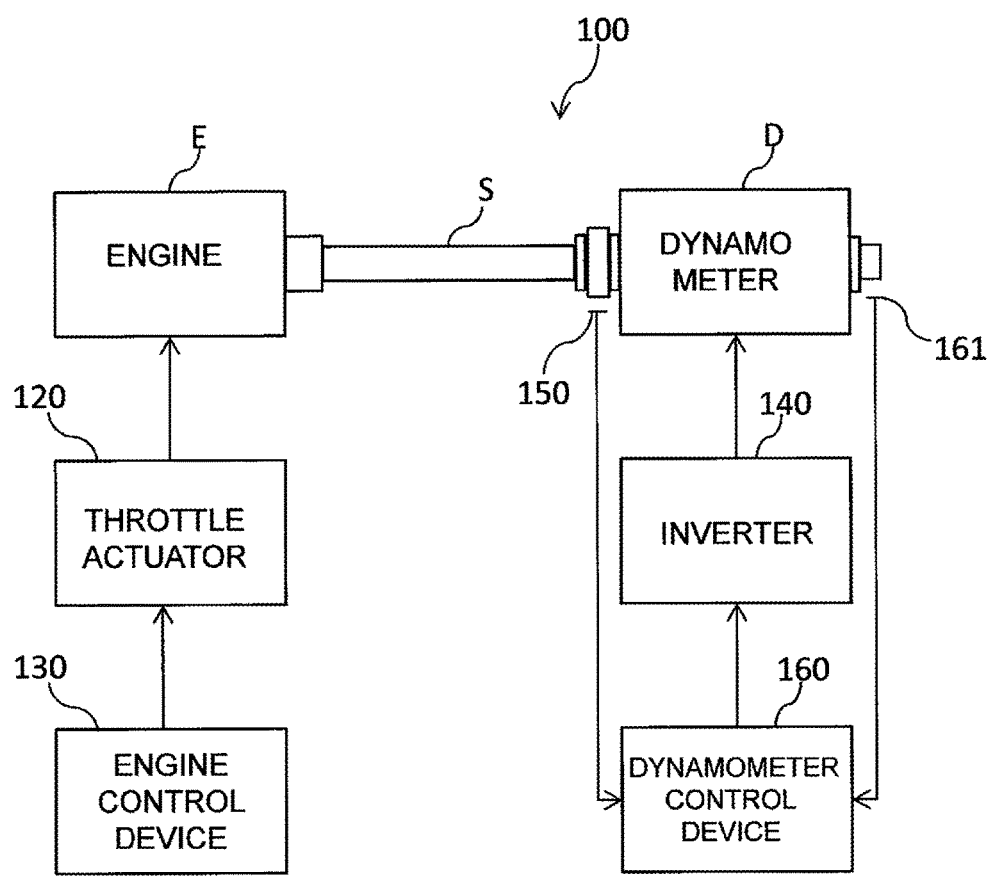
FIG. 8 is a configuration diagram of a dynamometer system according to a related art.
Figure 9:
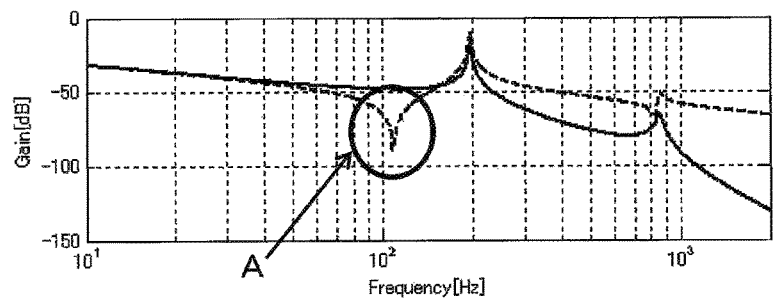
FIGS. 9A and 9B are graphs illustrating a closed-loop transmission characteristic upon inertia compensation of a dynamometer constituting the dynamometer system according to the related art.
Figure 9:
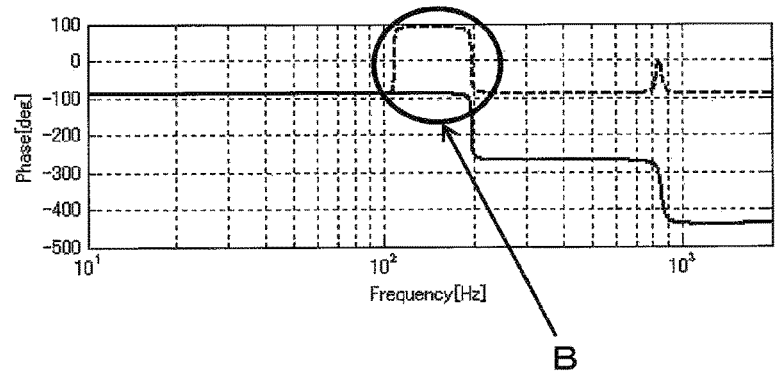

Engine test apparatuses according to embodiments (first to fourth embodiments) of the present invention will be described below with reference to the drawings. Note that, in the description of the present embodiments (first to fourth embodiments), the same constitutions or equivalent configurations as those of the above related art illustrated in FIG. 8 are denoted by the same reference signs. Although the engine test apparatuses according to the present embodiments (first to fourth embodiments) each perform various performance tests on an engine, inertia compensation control will be exemplified in the following description.

《First Embodiment》

First, an engine test apparatus according to a first embodiment of the present invention will be described with reference to FIGS. 1 to 4.

Figure 1:
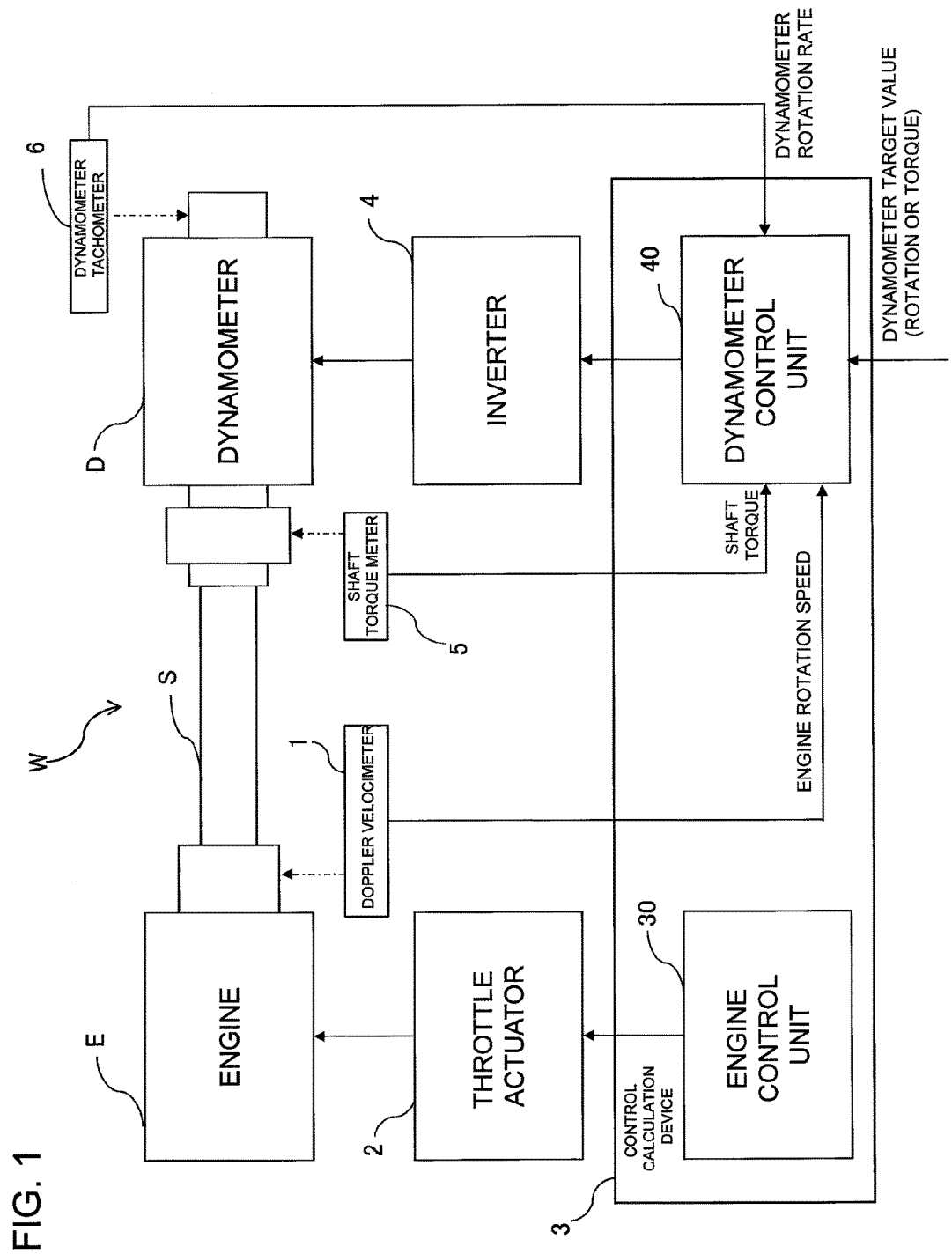
FIG. 1 is a schematic diagram illustrating a configuration of an engine test apparatus according to a first embodiment of the present invention.

As illustrated in FIG. 1, an engine test apparatus W according to the first embodiment includes a dynamometer D configured to apply a load to an engine E to be tested, a shaft S configured to connect the dynamometer D and the engine E, a control calculation device (hereinafter simply referred to as "control device") 3 configured to control the operations of the engine E and the dynamometer D, a throttle actuator 2 controlled by the control device 3 to operate the engine, and an inverter 4 controlled by the control device 3 to operate the dynamometer D.

Note that the shaft S is formed in a rod shape having one end connected to an output shaft of the engine E, and the other end connected to a rotation shaft of the dynamometer D. The shaft S is formed of a highly rigid material.

Figure 2:
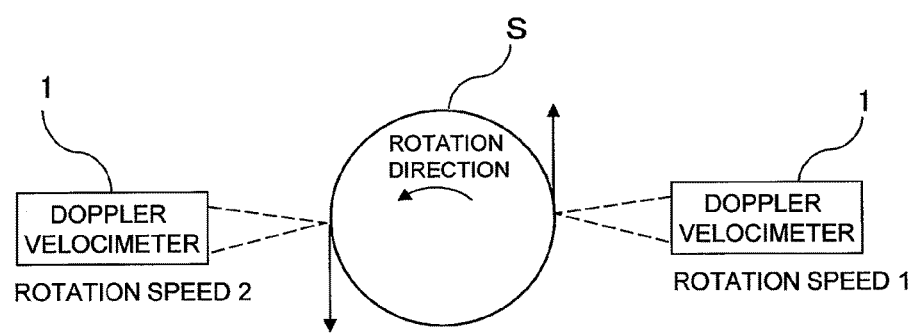
FIG. 2 is a schematic diagram illustrating installation positions of Doppler velocimeters constituting an engine test apparatus according to a first embodiment of the present invention.

Furthermore, the engine test apparatus W is provided with a Doppler velocimeter 1 emitting laser light to the one end (an end near the engine E) of the shaft S to contactlessly measure a rotation speed (rotation rate) of the output shaft of the engine E and transmitting the rotation speed (rotation rate) to the control device 3. Note that, in the first embodiment, as illustrated in FIG. 2, one pair (two) of Doppler velocimeters 1 is disposed opposite to each other to face the one end of the shaft S (disposed opposite to each other across the one end of the shaft S). Each of the pair of Doppler velocimeters 1 is set to emit laser light perpendicularly to a side surface of the one end of the shaft S, and detects a rotation speed at a laser-illuminated point of the one end of the shaft S. Note that, in an example illustrated in FIG. 2, the one pair (two) of Doppler velocimeters 1 is disposed in a horizontal direction, but is not particularly limited thereto. As long as the pair (two) of Doppler velocimeters 1 is disposed to oppose the shaft S, the Doppler velocimeters 1 may be at any installation positions. In addition, in the example illustrated in FIG. 2, the Doppler velocimeters 1 are disposed opposite to each other to face the one end of the shaft S, but the Doppler velocimeters 1 are not particularly limited the above configuration. For example, the pair (two) of Doppler velocimeters 1 may be disposed opposite to each other to face the output shaft of the engine E to emit laser light to the output shaft of the engine E to measure the rotation speed of the output shaft of the engine E.

Furthermore, the engine test apparatus W is provided with a shaft torque meter 5 disposed at the other end of the shaft S (end near the dynamometer D) to detect a torsion torque of the shaft S and transmit the torsion torque to the control device 3, and a dynamometer tachometer (encoder) 6 configured to detect a rotation speed (rotation rate) of an output shaft of the dynamometer D and transmit the rotation speed to the control device 3. Note that the shaft torque meter 5 and the dynamometer tachometer 6 have a well-known configuration.

Furthermore, the control device 3 includes an engine control unit 30 configured to control the engine E through the throttle actuator 2 configured to operate the engine E, and a dynamometer control unit 40 configured to control the dynamometer D through the inverter 4 configured to supply power to the dynamometer D.

Note that although a hardware configuration of the control device 3 is not particularly limited, for example, the control device 3 maybe constituted by a computer (at least one computer) including a CPU, an auxiliary storage device, a main storage device, a network interface, and an input/output interface. In this configuration, the two Doppler velocimeters 1, the shaft torque meter 5, the dynamometer tachometer 6, and a control processing device (not illustrated) configured to transmit a dynamometer target value are connected to the input/output interface. Furthermore, in the auxiliary storage device, a program is stored to achieve functions of the engine control unit 30 and the dynamometer control unit 40. The functions of the engine control unit 30 and the dynamometer control unit 40 are achieved by loading the program into the main storage device to be executed by the CPU.

Furthermore, the engine control unit 30 is configured to receive a request from an operator, start the engine E through the throttle actuator 2, and operate the engine E in a predetermined manner. Note that since the function of the engine control unit 30 according to the first embodiment is the same as that of a well-known art, and a detailed description thereof will be omitted.

Furthermore, the dynamometer control unit 40 is configured to receive rotation speeds (rotation speed 1, rotation speed 2) of the output shaft of the engine E transmitted from the two Doppler velocimeters 1, and calculate an average value ((rotation speed 1+rotation speed 2)/2) of the received rotation speeds (absolute values). An average value of measured rotation speeds is calculated in this way by the pair of Doppler velocimeters 1 disposed opposite to each other to face the one end of the shaft S, for the following reason.

Specifically, in the measurement by the Doppler velocimeters 1 illustrated in FIG. 2, vibration in a direction perpendicular to a laser emission direction and a in a direction detected as the rotation speed (vertical direction illustrated in FIG. 2) (hereinafter referred to as "vibration of main body of the engine E", for convenience of description) of vibrations of the engine E or the shaft S is measured as the rotation speed. Note that in this case, "vibration in a thrust direction of the shaft S" and "vibration in a front-rear direction to the laser-illuminated point (right and left direction in FIG. 2)" are not measured. That is, the rotation speed measured by the Doppler velocimeter 1 illustrated in FIG. 2 includes "vibration of main body of the engine E" as rotation noise. Therefore, in the first embodiment, an average value of rotation speeds measured by the pair of Doppler velocimeters 1 disposed opposite to each other to face the one end (the end near the engine E) of the shaft S is calculated to cancel the rotation noise caused by the vibration of main body of the engine E (vibration in the vertical direction in the example of FIG. 2), and an accurate value of the rotation speed (rotation rate) of output shaft of the engine E can be acquired.

Furthermore, the dynamometer control unit 40 controls the operation of the dynamometer D through the inverter 4 so that the engine E operated by the engine control unit 30 is operated in the unloaded state as if "the shaft S and the dynamometer D" are not connected, by using the calculated "average value of the rotation speed (rotation rate) of the output shaft of the engine E" to generate a torque current command (dynamometer command value) corresponding to a torque value to be generated in the dynamometer D, and inputting the torque current command to the inverter 4 (thereby operation of the engine E is also controlled).

Note that the dynamometer control unit 40 is configured to receive the torsion torque of the shaft S measured by the shaft torque meter 5, the rotation speed (rotation rate) of the output shaft of the dynamometer D measured by the dynamometer tachometer 6, and the dynamometer target value (rotation rate or torque) transmitted from the control processing device not illustrated. Furthermore, the dynamometer control unit 40 is configured to use the above measured values (torsion torque, rotation speed (rotation rate) of the output shaft of the dynamometer D), and the dynamometer target value (rotation rate or torque) for processing other than the inertia compensation control. However, since the control using the measured values (torsion torque, rotation speed (rotation rate) of the output shaft of the dynamometer D) and the dynamometer target value (rotation rate or torque) is similar to that of the well-known art, and description thereof will be omitted.

Figure 3:
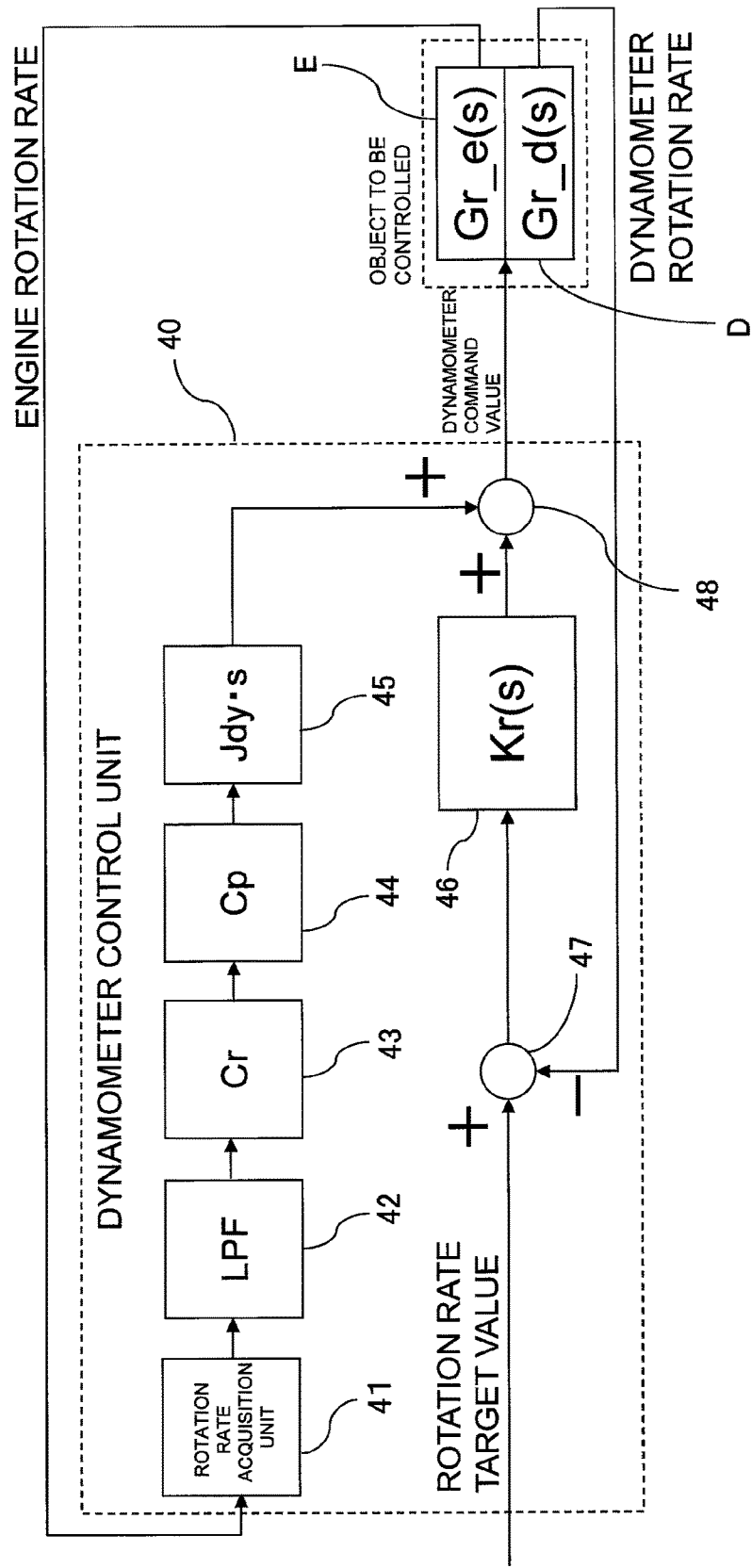
FIG. 3 is a schematic diagram illustrating a function of an inertia compensation control process performed by a dynamometer control unit of an engine test apparatus according to a first embodiment of the present invention.
Figure 4:
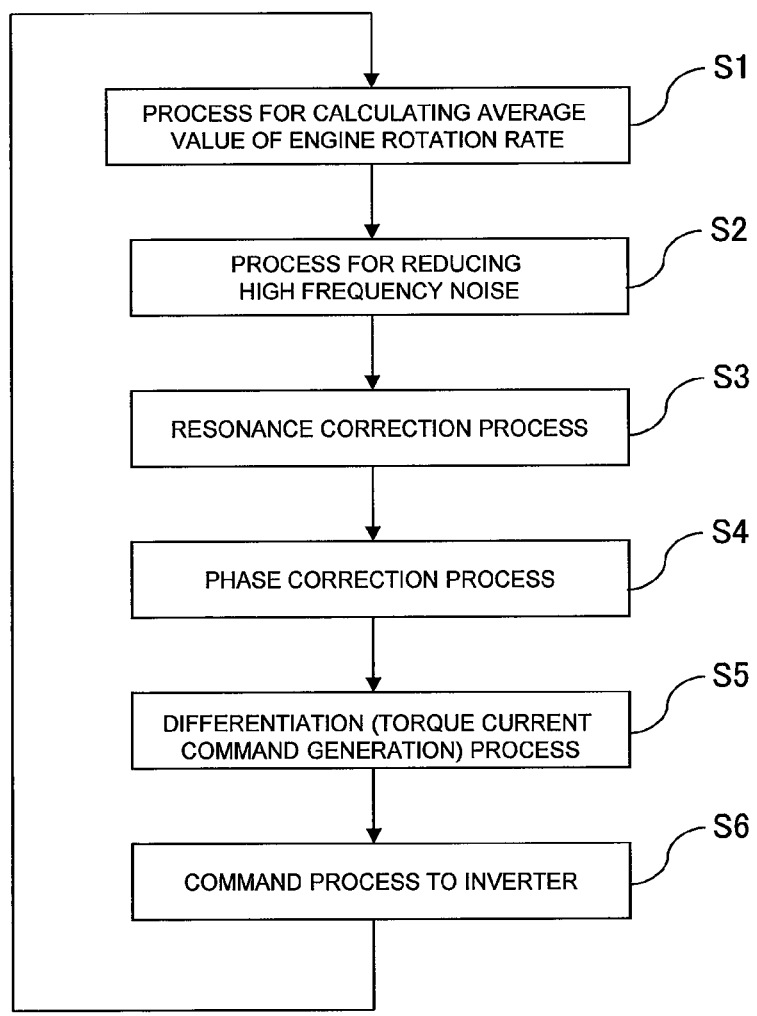
FIG. 4 is a flowchart illustrating an inertia compensation control process of one control cycle performed by the dynamometer control unit of the engine test apparatus according to a first embodiment of the present invention.

Here, the "inertia compensation control" performed by the dynamometer control unit 40 will be described with reference to FIGS. 3 and 4. Here, FIG. 3 is a schematic diagram illustrating a function of the inertia compensation control process performed by the dynamometer control unit of the engine test apparatus according to the first embodiment of the present invention. FIG. 4 is a flowchart illustrating one control cycle of the inertia compensation control process performed by the dynamometer control unit of the engine test apparatus according to the first embodiment of the present invention.

Note that S2 to S6 of the flowchart illustrated in FIG. 4 are similar to those of the well-known art, excepting use of the rotation speed (rotation rate) of the output shaft of the engine E, and description thereof is simplified below. In addition, before start of the flowchart illustrated in FIG. 4, the engine E is started by the engine control unit 30.

As illustrated in FIG. 3, the dynamometer control unit 40 includes a rotation rate acquisition unit 41, a low-pass filter unit 42, a resonance correction unit 43, a phase correction unit 44, a torque command generation unit 45, a dynamometer rotation rate control unit 46, a reception unit 47 configured to receive a dynamometer target value and a dynamometer rotation rate, and a transmission unit 48 configured to transmit a torque current command (dynamometer command value) to the inverter 4 (not illustrated in FIG. 3).

Note that since the dynamometer rotation rate control unit 46 and the reception unit 47 are not related to the "inertia compensation control", their explanation will be omitted.

In the inertia compensation control process, as illustrated in FIG. 4, first, the rotation rate acquisition unit 41 receives rotation speeds (rotation rates) of the output shaft of the engine E transmitted from the two Doppler velocimeters 1, calculates an average value (rotation rate) of the received rotation speeds, outputs the average value to the low-pass filter unit 42 (S1), and the process proceeds to S2.

In S2, the low-pass filter unit 42 removes high-frequency noise from the average value (rotation rate) of the rotation speeds calculated in S1 (S2), and the process proceeds to S3.

In S3, the resonance correction unit 43 performs a resonance correction process for reducing the gain of a preset resonance portion (specific frequency) from the rotation rate from which the high frequency noise described above is removed, and the process proceeds to S4.

In S4, the phase correction unit 44 recovers a phase delay amount of a preset frequency range (predetermined frequency range (frequency around low frequency to 100 Hz))

by a phase lead compensation process, for the rotation rate subjected to the resonance correction in S3, and the process proceeds to S5.

In S5, the torque command generation unit 45 uses the rotation rate subjected to the phase correction in S4 to generate a torque current command (dynamometer command value) corresponding to a torque value to be generated in the dynamometer D so that the engine E is operated in the unloaded state as if "the shaft S and the dynamometer D" are not connected. Specifically, the torque command generation unit 45 converts the rotation rate subjected to the phase correction in S4 to the dimension of torque (conversion by differential operation) to generate a torque current command (dynamometer command value), and outputs the generated torque current command (dynamometer command value) to the transmission unit 48.

In S6, the transmission unit 48 transmits the torque current command (dynamometer command value) generated in S5 to the inverter 4, and the process returns to S1. Note that the inverter 4 uses the received torque current command (dynamometer command value) to control the operation of the dynamometer D, and thus, the engine E is controlled to be operated in the unloaded state as if "the shaft S and the dynamometer D" are not connected.

As described above, in the first embodiment, the Doppler velocimeter 1 is provided which emits laser light to the side surface of the one end (the end near the engine) of the shaft S connected to the engine E to contactlessly measure the rotation speed (rotation rate) of the output shaft of the engine E and transmit the measured rotation speed to the control device 3. That is, in the first embodiment, since the rotation speed of the output shaft of the engine E is contactlessly measured without influence of the heat of the engine E, and an accurate value can be measured in the vicinity of the engine E. Furthermore, in the first embodiment, an average value of rotation speeds (rotation rates) of the output shaft of the engine E measured by the two Doppler velocimeters 1 is obtained to cancel the rotation noise caused by the vibration of main body of the engine E (vibration in the vertical direction in the example of FIG. 2), and an accurate rotation speed (rotation rate) can be acquired. In the first embodiment, since the inertia compensation control is performed using the rotation speed of output shaft of the engine E, a frequency range for inertia compensation is not limited as in the inertia compensation control using the rotation speed (dynamometer rotation rate) of the dynamometer D according to a related art. Therefore, not only the behavior of the engine E at starting up, but also rotation speed variation of the engine E caused by explosion variation can be reproduced. Thus, according to the first embodiment, various characteristics of the engine E can be measured with high accuracy as compared with the related art.

«Second Embodiment»

Next, an engine test apparatus according to a second embodiment of the present invention will be described with reference to FIG. 5. Here, FIG. 5 is a schematic diagram illustrating installation positions of Doppler velocimeters constituting the engine test apparatus according to the second embodiment of the present invention.

Note that in the second embodiment the engine test apparatus has installation positions of the Doppler velocimeters 1 different from those of the engine test apparatus W according to the first embodiment, a partially modified process of calculating the rotation rate of the engine E which is performed by the dynamometer control unit 40, and is otherwise the same as the first embodiment. Therefore, in the second embodiment, only a difference from the first embodiment will be described. Furthermore, in the second embodiment, the same reference signs as those in the first embodiment are used.

In the first embodiment as well, two Doppler velocimeters 1 are provided also in the second embodiment.

Figure 5:
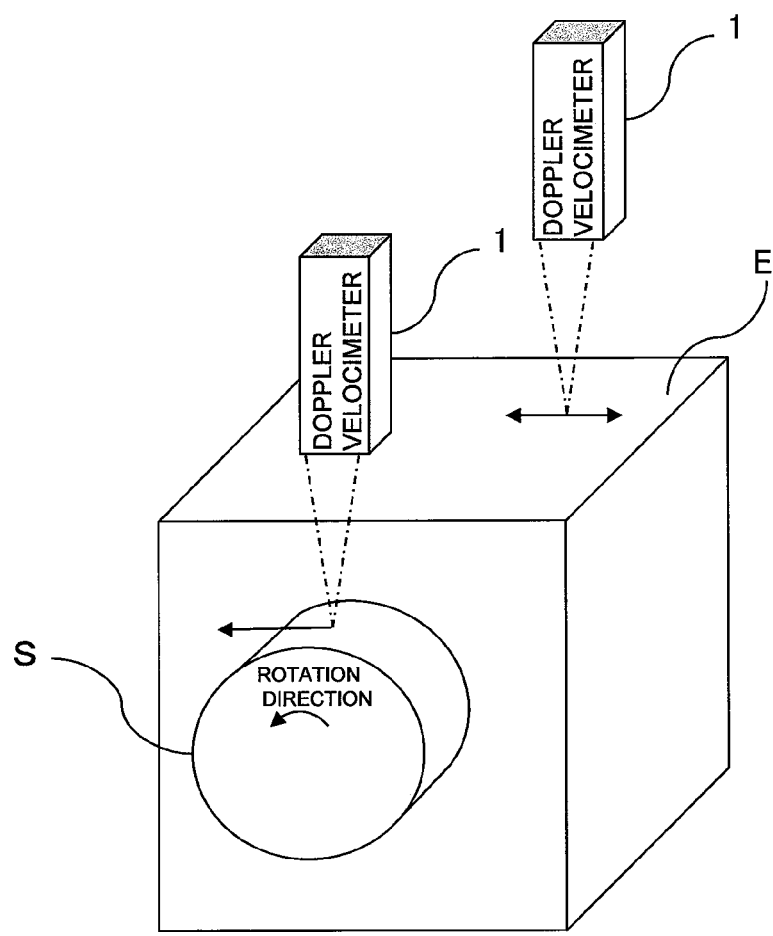
FIG. 5 is a schematic diagram illustrating installation positions of Doppler velocimeters constituting an engine test apparatus according to a second embodiment of the present invention.

Specifically, as illustrated in FIG. 5, in the second embodiment, one Doppler velocimeter 1 of the two Doppler velocimeters 1 (referred to as "first Doppler velocimeter 1" for convenience of description) is disposed in the vicinity of one end (an end near the engine E) of the shaft S (above the one end of the shaft S, in an example of FIG. 5). The first Doppler velocimeter 1 is configured to emit laser light toward a side surface of the one end of the shaft S to contactlessly measure a rotation speed (rotation rate) of the output shaft of the engine E, and transmit the rotation speed to the control device 3. Note that in the second embodiment as well, the first Doppler velocimeter 1 may be configured to emit laser light to the output shaft of the engine E to measure the rotation speed of the output shaft of the engine E.

In the second embodiment, the other Doppler velocimeter 1 of the two Doppler velocimeters 1 (referred to as "second Doppler velocimeter 1" for convenience of description) is disposed at a position from which laser light can be emitted in the same direction as that of the first Doppler velocimeter 1, and in the vicinity of the engine E (above one end of the engine E, in an example of FIG. 5). The second Doppler velocimeter 1 is configured to emit laser light to the main body of the engine E to contactlessly measure the vibration speed of the main body of the engine E (vibration speed in a direction perpendicular to the laser emission direction and parallel to a rotation direction of the shaft S (in a horizontal direction in FIG. 5)), and transmit the vibration speed to the control device 3. Note that the second Doppler velocimeter 1 is disposed at a position closer to the shaft S. In addition, as long as the two Doppler velocimeters 1 are installed at positions from which laser light can be emitted in the same direction, the two Doppler velocimeters 1 may be positioned at any installation positions (e.g., may be installed at positions from which laser light can be emitted from below or left side (or right side) of the shaft S).

Furthermore, in the second embodiment, the process of S1 of FIG. 4 described above is changed as follows.

Specifically, in the second embodiment, the rotation rate acquisition unit 41 of the dynamometer control unit 40 receives the rotation speed of the output shaft of the engine E transmitted from the first Doppler velocimeter 1, and the vibration speed of the engine E transmitted from the second Doppler velocimeter. Then, the rotation rate acquisition unit 41 calculates, as the rotation rate of the output shaft of the engine E, a value obtained by subtracting the received vibration speed of the engine E, from the received rotation speed of the output shaft of the engine E, and outputs the value to the low-pass filter unit 42. Note that the processes of S2 to S6 are the same as those of the first embodiment.

In the second embodiment, the above configuration is adopted for the following reason. Specifically, the rotation speed (rotation rate) measured by the first Doppler velocimeter 1, as described above, includes rotation noise caused by vibration (vibration in a horizontal direction in the example of FIG. 5) of the main body of the engine E. Therefore, in the second embodiment, the vibration speed in the rotation direction of the output shaft of the engine is measured by the second Doppler velocimeter emitting laser light in the same direction as that of the first Doppler velocimeter 1, the vibration speed of the engine E measured by the second Doppler velocimeter 1 is subtracted from the rotation speed measured by the first Doppler velocimeter 1, and the rotation noise is canceled. Thus, in the second embodiment as well, the rotation speed (rotation rate) of the output shaft of the engine E can be also acquired accurately to control the operation of the dynamometer D, using the rotation speed (rotation rate), and thus, the characteristics of the engine E can be measured with high accuracy, in comparison with the related art.

«Third Embodiment»

Next, an engine test apparatus according to a third embodiment of the present invention will be described with reference to FIG. 6. Here, FIG. 6 is a schematic diagram illustrating an installation position of a Doppler velocimeter constituting the engine test apparatus according to the third embodiment of the present invention.

Note that in the third embodiment, the engine test apparatus includes a single Doppler velocimeter 1 and one displacement meter 8, differently from the engine test apparatus W according to the first embodiment using the two Doppler velocimeters 1, uses a measured value measured by the Doppler velocimeter 1, and a measured value measured by the displacement meter 8 to calculate the rotation rate of the engine E, and is otherwise the same as the first embodiment. Therefore, in the third embodiment, only a difference from the first embodiment will be described. In the third embodiment, the same reference signs as those in the first embodiment are used.

Figure 6:
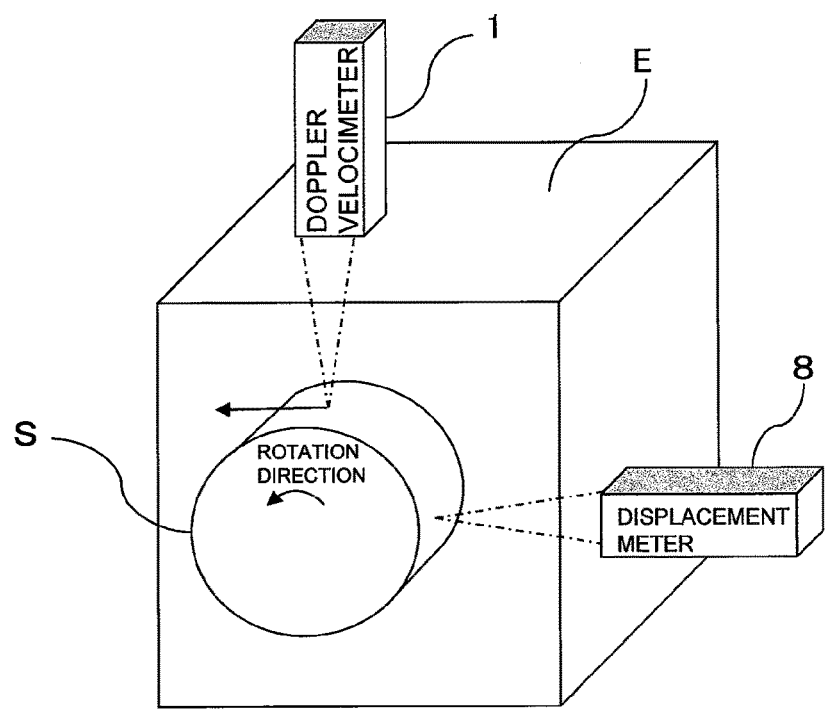
FIG. 6 is a schematic diagram illustrating an installation position of a Doppler velocimeter constituting an engine test apparatus according to a third embodiment of the present invention.

As illustrated in FIG. 6, in the third embodiment, the Doppler velocimeter 1 is disposed in the vicinity of one end (an end near the engine E) of the shaft S (above the one end of the shaft S, in an example of FIG. 6). The Doppler velocimeter 1 is configured to emit laser light toward a side surface of the one end of the shaft S to contactlessly measure a rotation speed (rotation rate) of the output shaft of the engine E, and transmit the rotation speed to the control calculation device 3. Note that in the third embodiment as well, the Doppler velocimeter 1 maybe configured to emit laser light to the output shaft of the engine E to measure the rotation speed of the output shaft of the engine E.

Furthermore, in the third embodiment, a displacement meter 8 is provided for contactlessly measuring displacement (displacement caused by vibration) in a rotation direction of the one end of the shaft S, measured by the Doppler velocimeter 1, and transmitting the displacement to the control calculation device 3. The displacement meter 8 is not particularly limited, but, for example, for the displacement meter 8, a laser displacement meter can be employed, which emits laser light to a side surface of the one end of the shaft S to measure displacement of a portion which is illuminated with the laser light. In this configuration, the displacement meter 8 and the Doppler velocimeter 1 are disposed so that a laser emission direction of the displacement meter 8, and a laser emission direction of the Doppler velocimeter 1 are perpendicular (90°) to each other.

Note that each of the Doppler velocimeter 1 and the displacement meter 8 may be positioned at any installation position (for example, the Doppler velocimeter 1 may be disposed at a position where laser light is emitted from below), as long as the Doppler velocimeter 1 and the displacement meter 8 each disposed at a position where laser light is emitted to a side surface of the one end of the shaft S, and the laser emission direction of the displacement meter 8 and the laser emission direction of the Doppler velocimeter 1 are perpendicular (90°) to each other.

Furthermore, in the third embodiment, the process of S1 of FIG. 4 described above is changed as follows.

Specifically, in the third embodiment, the rotation rate acquisition unit 41 of the dynamometer control unit 40 receives a rotation speed (rotation rate) of the output shaft of the engine E measured by the Doppler velocimeter 1, and displacement (displacement caused by vibration) in a rotation direction of the shaft S measured by the displacement meter 8. Then, the rotation rate acquisition unit 41 calculates, as rotation noise, a speed obtained by differentiating the displacement transmitted from the displacement meter 8, calculates, as the rotation speed of the engine E, a value obtained by subtracting the calculated rotation noise, from the rotation speed (rotation rate) of the output shaft of the engine E transmitted from the Doppler velocimeter 1, and outputs the value to the low-pass filter unit 42. Note that the processes of S2 to S6 are the same as those of the first embodiment.

In the third aspect, the above configuration is adopted for the following reason. Specifically, as described above, the rotation speed measured by the Doppler velocimeter 1 includes the rotation noise caused by vibration of the main body of the engine E. Therefore, in the third embodiment, the displacement meter 8 is provided for contactlessly measuring the displacement in the rotation direction of the shaft S, in the measurement unit of the Doppler velocimeter 1. Furthermore, the speed obtained by differentiating the displacement in the rotation direction measured by the displacement meter 8 is calculated as the rotation noise, the rotation noise is subtracted from the rotation speed of the engine E transmitted from the Doppler velocimeter 1, and the rotation noise is removed to obtain an accurate rotation speed. Thus, in the third embodiment as well, the rotation speed of the output shaft of the engine E can be accurately acquired, and the operation of the dynamometer D can be controlled using the accurate rotation speed of the engine E, and thus the characteristics of the engine E can be measured with high accuracy, in comparison with the related art.

Note that in the third embodiment, an object to be measured by the displacement meter 8 may be changed to the main body of the engine E, instead of the shaft S so that the displacement of the main body of the engine E is measured by the displacement meter 8. In this configuration, the control device 3 calculates, as the rotation noise, the speed obtained by differentiating the measured displacement of the engine E, and calculates, as the rotation rate of the engine E, a value obtained by subtracting the calculated rotation noise from the rotation speed (rotation rate) of the output shaft of the engine E transmitted from the Doppler velocimeter 1.

«Fourth Embodiment»

Next, an engine test apparatus according to a fourth embodiment of the present invention will be described with reference to FIG. 7. Here, FIG. 7 is a schematic diagram illustrating an installation position of a Doppler velocimeter constituting the engine test system according to the fourth embodiment of the present invention.

Note that in the fourth embodiment, the engine test apparatus includes only a single Doppler velocimeter 1, differently from the engine test apparatus W according to the first embodiment using two Doppler velocimeters 1, performs inertia compensation control using a rotation speed (rotation rate) measured by the single Doppler velocimeter 1, and is otherwise the same as the first embodiment. Therefore, in the fourth embodiment, only a difference from the first embodiment will be described. In the fourth embodiment, the same reference signs as those in the first embodiment are used.

Figure 7:
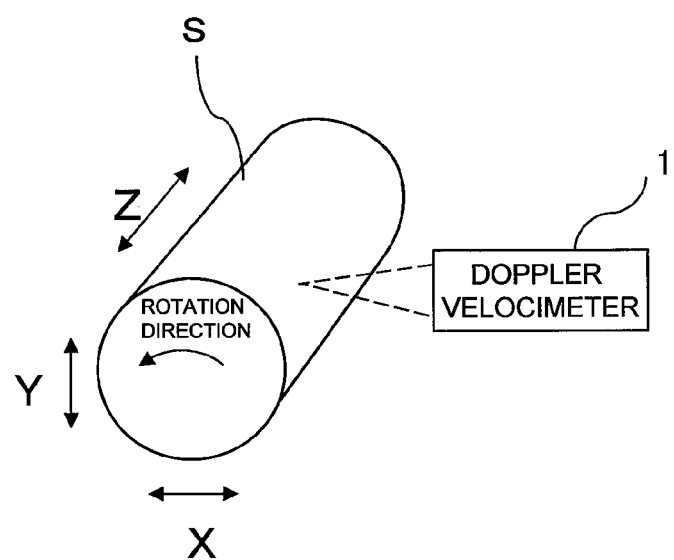
FIG. 7 is a schematic diagram illustrating an installation position of a Doppler velocimeter constituting an engine test system according to a fourth embodiment of the present invention.

As illustrated in FIG. 7, in the fourth embodiment, the single Doppler velocimeter 1 is disposed in the vicinity of one end (an end near the engine E) of the shaft S. The Doppler velocimeter 1 is configured to emit laser light toward a side surface of the one end of the shaft S to contactlessly measure the rotation speed (rotation rate) of the output shaft of the engine E, and transmit the rotation speed to the control device 3. Note that in the fourth embodiment as well, the Doppler velocimeter 1 may be configured to emit laser light to the output shaft of the engine E to measure the rotation speed of the output shaft of the engine E.

Furthermore, in the fourth embodiment, the process of S1 of FIG. 4 described above is changed as follows.

Specifically, in the fourth embodiment, the rotation rate acquisition unit 41 of the dynamometer control unit 40 receiving the rotation speed of the output shaft of the engine E transmitted from the Doppler velocimeter 1, outputs the received rotation speed to the low-pass filter unit 42. Note that the processes of S2 to S6 are the same as those of the first embodiment.

As described above, in the fourth embodiment as well, since the rotation speed (rotation rate) of the output shaft of the engine E is contactlessly measured, without influence of the heat of the engine E, and an accurate value can be measured in the vicinity of the engine E. In the fourth embodiment, since the inertia compensation control is performed using the rotation speed of output shaft of the engine E accurately measured, a frequency range for inertia compensation is not limited as in the inertia compensation control using the rotation speed (dynamometer rotation rate) of the dynamometer D according to a related art. Thus, according to the fourth embodiment, the characteristics of the engine E can be measured with high accuracy, in comparison with the related art.

As described above, according to the embodiments (the first to fourth embodiments) of the present invention, an engine test apparatus W can be provided to measure the characteristics of an engine with high accuracy.

It should be noted that the present invention is not limited to the above embodiments, and various changes and modifications may be made within the spirit and scope of the present invention. For example, in the above embodiments (the first to fourth embodiments), the inertia compensation control is performed using the rotation rate of the output shaft of the engine E measured by the Doppler velocimeter 1, but is not particularly limited thereto. The rotation speed (rotation rate) of the engine E measured by the Doppler velocimeter 1 is also used for control other than the inertia compensation control.

In the above embodiments (the first to fourth embodiments), measurement of the rotation speed (rotation rate) of the output shaft of the engine E is performed by the Doppler velocimeter 1, but is not particularly limited thereto. Any device other than the Doppler velocimeter 1 can be applied to the present invention, as long as the device can contactlessly measure the rotation speed (rotation rate) of the shaft S in rotation.

REFERENCE SIGNS LIST

W engine test apparatus
E engine
S shaft
D dynamometer
1 Doppler velocimeters
2 throttle actuator
3 control calculation device (control device)
4 inverter
5 shaft torque meter
6 dynamometer tachometer
8 displacement meter
30 engine control unit
40 dynamometer control unit
41 rotation rate acquisition unit
42 low-pass filter unit
43 resonance correction unit
44 phase correction unit
45 torque command generation unit
46 dynamometer rotation rate control unit
47 reception unit
48 transmission unit

What is claimed is:

1. An engine test apparatus comprising:
   a dynamometer having a rotation shaft, which is connected to an output shaft of an engine across a connecting shaft;
   a control device configured to control operations of the engine and the dynamometer; and
   a pair of Doppler velocimeters configured to emit laser light to the output shaft or an end of the connecting shaft directly connected to the output shaft,
   wherein
   the shaft has the one end connected to the output shaft of the engine, and an other end connected to the rotation shaft of the dynamometer,
   the pair of Doppler velocimeters is disposed opposite to each other to face the one end of the shaft or the output shaft of the engine,
   the pair of Doppler velocimeters contactlessly measures a rotation speed of the output shaft of the engine, and transmits the measured rotation speed to the control device, and
   the control device calculates an average value of the rotation speed on the basis of the rotation speeds of the output shaft of the engine, transmitted from the pair of Doppler velocimeters, and uses the average value of the rotation speed to control the operation of the dynamometer.

2. An engine test apparatus comprising:
   a dynamometer connected to an engine across a connecting shaft,
   a control device configured to control operations of the engine and the dynamometer,
   a first Doppler velocimeter, and
   a second Doppler velocimeter,
   wherein
   the connecting shaft has one end connected to an output shaft of the engine, and an other end connected to a rotation shaft of the dynamometer,
   the first Doppler velocimeter is configured to emit laser light to the one end of the connecting shaft directly connected to the output shaft of the engine or the output shaft of the engine in order to contactlessly measure a rotation speed of the output shaft of the engine, and transmit the measured rotation speed to the control device, and
   the second Doppler velocimeter is configured to emit laser light to an engine body to contactlessly measure a vibration speed of the engine body in a direction perpendicular to an emission direction of the laser light and in a direction parallel to a rotation direction of the connecting or output shaft, and transmit the measured vibration speed to the control device, the first Doppler velocimeter and the second Doppler velocimeter are disposed to emit laser light in the same direction, and the control device calculates a value obtained by subtracting the vibration speed of the engine body, transmitted from the second Doppler velocimeter, from a rotation speed of the engine transmitted from the first Doppler velocimeter, and uses the calculated value to control the operation of the dynamometer.

3. An engine test apparatus comprising:

a dynamometer having a rotation shaft, which is connected to an output shaft of an engine across a connecting shaft;

a control device configured to control operations of the engine and the dynamometer;

a Doppler velocimeter configured to emit laser light to the output shaft or an end of the connecting shaft directly connected to the output shaft of the engine; and a displacement meter, wherein the connecting shaft has the one end connected to the output shaft of the engine, and an other end connected to the rotation shaft of the dynamometer, the Doppler velocimeter is configured to contactlessly measure a rotation speed of the output shaft of the engine, and transmit the measured rotation speed to the control device, and the displacement meter is configured to contactlessly measure displacement in a rotation direction of the output shaft at one end of the output shaft, measured by the Doppler velocimeter, and transmit the measured displacement to the control device, and the control device calculates, as rotation noise, a speed obtained by differentiating displacement in a rotation direction transmitted from the displacement meter, calculates a value obtained by subtracting the rotation noise from rotation speed of the output shaft of the engine, transmitted from the first Doppler velocimeter, and uses the calculated values to control the operation of the dynamometer.

\* \* \* \* \*